United States Patent
Arumugam et al.

(10) Patent No.: US 11,157,641 B2
(45) Date of Patent: Oct. 26, 2021

(54) SHORT-CIRCUIT DATA ACCESS

(71) Applicant: BlueTalon, Inc., Redwood City, CA (US)

(72) Inventors: Dilli Dorai Minnal Arumugam, Campbell, CA (US); Prasad Mujumdar, Fremont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 208 days.

(21) Appl. No.: 15/201,325

(22) Filed: Jul. 1, 2016

(65) Prior Publication Data

US 2018/0004970 A1 Jan. 4, 2018

(51) Int. Cl.
*G06F 21/62* (2013.01)
*G06F 16/182* (2019.01)
*G06F 21/60* (2013.01)

(52) U.S. Cl.
CPC ........ *G06F 21/6218* (2013.01); *G06F 16/182* (2019.01); *G06F 21/604* (2013.01)

(58) Field of Classification Search
CPC ............... G06F 21/604; G06F 21/6218; G06F 17/30194
USPC .......................................................... 726/1
See application file for complete search history.

(56) References Cited

U.S. PATENT DOCUMENTS

| | | | |
|---|---|---|---|
| 5,113,499 A * | 5/1992 | Ankney | H04L 29/00 340/5.74 |
| 5,537,548 A | 7/1996 | Fin | |
| 6,163,272 A * | 12/2000 | Goode | G06F 21/6218 725/30 |
| 6,173,289 B1 * | 1/2001 | Sonderegger | G06F 9/445 |

(Continued)

FOREIGN PATENT DOCUMENTS

| | | | |
|---|---|---|---|
| WO | 2008118663 | 10/2008 | |
| WO | WO-2008118663 A1 * | 10/2008 | ........... G06F 21/575 |

(Continued)

OTHER PUBLICATIONS

Vernekar, Sumeet S., and Amar Buchade. "MapReduce based log file analysis for system threats and problem identification." In Advance Computing Conference (IACC), 2013 IEEE 3rd International, pp. 831-835. IEEE, 2013. (Year: 2013).*

(Continued)

*Primary Examiner* — Luu T Pham
*Assistant Examiner* — Walter J Malinowski
(74) *Attorney, Agent, or Firm* — Fiala & Weaver P.L.L.C.

(57) ABSTRACT

A policy system enforces data security policies for requests from accessing data stored on a distributed data storage system received from a client device. The policy enforcement system can determine user credentials from the requests. The enforcement system then determines whether the user credentials allow the request to retrieve the data and if yes, whether the user credentials allow the request to retrieve the data without obligations. Upon determining that user credentials allow the request to retrieve the data without (Continued)

obligations, the policy enforcement system directs the client device to communicate directly with a name node of the data storage system, short-circuiting additional data retrieval and filtering of the policy system.

20 Claims, 4 Drawing Sheets

(56) References Cited

U.S. PATENT DOCUMENTS

| | | | |
|---|---|---|---|
| 6,205,466 B1* | 3/2001 | Karp | G06F 9/468 707/999.001 |
| 6,226,372 B1 | 5/2001 | Beebe | |
| 6,463,470 B1 | 10/2002 | Mohaban | |
| 6,643,683 B1* | 11/2003 | Drumm | H04L 67/10 709/203 |
| 6,687,229 B1 | 2/2004 | Kataria | |
| 7,304,982 B2* | 12/2007 | Hondo | H04L 29/06 370/351 |
| 7,542,943 B2 | 6/2009 | Caplan | |
| 7,631,084 B2 | 12/2009 | Thomas | |
| 7,730,089 B2 | 6/2010 | Campbell | |
| 8,051,491 B1* | 11/2011 | Cavage | G06F 21/6218 726/30 |
| 8,196,183 B2 | 6/2012 | Smith | |
| 8,341,717 B1* | 12/2012 | Delker | H04L 63/20 705/56 |
| 8,346,929 B1* | 1/2013 | Lai | G06Q 10/10 709/226 |
| 8,613,108 B1 | 12/2013 | Aggarwal | |
| 8,683,560 B1 | 3/2014 | Brooker | |
| 8,745,612 B1* | 6/2014 | Semenzato | G06F 8/65 717/170 |
| 8,849,716 B1* | 9/2014 | Everhart | H04L 63/10 705/51 |
| 8,910,263 B1* | 12/2014 | Martini | H04L 63/102 726/8 |
| 8,997,198 B1* | 3/2015 | Kelley | G06F 16/182 726/10 |
| 9,003,474 B1* | 4/2015 | Smith | G06F 21/606 726/1 |
| 9,038,151 B1* | 5/2015 | Chua | H04L 45/28 726/6 |
| 9,317,452 B1* | 4/2016 | Forschmiedt | G06F 12/1458 |
| 9,614,715 B2 | 4/2017 | Bhave | |
| 9,723,005 B1* | 8/2017 | McInerny | H04L 63/10 |
| 9,866,592 B2* | 1/2018 | Arumugam | G06F 21/602 |
| 9,871,825 B2* | 1/2018 | Arumugam | H04L 63/08 |
| 9,959,280 B1* | 5/2018 | Whitehead | G06F 17/30117 |
| 10,055,139 B1* | 8/2018 | Bent | G06F 3/0611 |
| 10,277,633 B2* | 4/2019 | Arumugam | G06F 21/602 |
| 2001/0023486 A1 | 9/2001 | Kayashinna | |
| 2002/0007404 A1 | 1/2002 | Vange | |
| 2002/0019828 A1 | 2/2002 | Mortl | |
| 2002/0083058 A1* | 6/2002 | Hsiao | G06F 21/105 |
| 2002/0156879 A1* | 10/2002 | Delany | H04L 67/2852 709/223 |
| 2002/0169907 A1 | 11/2002 | Candea | |
| 2002/0178249 A1* | 11/2002 | Prabakaran | G06F 11/1451 709/223 |
| 2003/0018786 A1 | 1/2003 | Lortz | |
| 2003/0021283 A1 | 1/2003 | See | |
| 2003/0046315 A1 | 3/2003 | Feig | |
| 2003/0079143 A1* | 4/2003 | Mikel | H04L 9/3271 726/8 |
| 2003/0115322 A1 | 6/2003 | Moriconi | |
| 2003/0124974 A1* | 7/2003 | Asami | H04H 20/16 455/3.02 |
| 2003/0200215 A1* | 10/2003 | Chen | G06F 21/10 |
| 2003/0225707 A1* | 12/2003 | Ehrman | G06Q 10/08 705/64 |
| 2004/0015470 A1* | 1/2004 | Smith | G06F 16/21 |
| 2004/0022191 A1* | 2/2004 | Bernet | H04L 47/10 370/230 |
| 2004/0054791 A1 | 3/2004 | Chakraborty | |
| 2004/0073668 A1 | 4/2004 | Bhat | |
| 2004/0083464 A1* | 4/2004 | Cwalina | G06F 8/70 717/141 |
| 2004/0088560 A1 | 5/2004 | Danks | |
| 2004/0114155 A1* | 6/2004 | Kurahashi | H04N 1/00567 358/1.1 |
| 2004/0128394 A1 | 7/2004 | Knauerhase | |
| 2004/0167984 A1* | 8/2004 | Herrmann | H04L 63/08 709/229 |
| 2004/0267749 A1 | 12/2004 | Bhat | |
| 2005/0021818 A1* | 1/2005 | Singhal | H04L 67/2842 709/232 |
| 2005/0021978 A1 | 1/2005 | Bhat | |
| 2005/0027915 A1* | 2/2005 | Gragg | G06F 9/52 710/301 |
| 2005/0101293 A1* | 5/2005 | Mentze | H04W 12/03 455/410 |
| 2005/0188419 A1* | 8/2005 | Dadhia | G06F 21/52 726/1 |
| 2005/0278775 A1* | 12/2005 | Ross | H04L 63/08 726/2 |
| 2005/0289144 A1* | 12/2005 | Dettinger | G06F 21/6227 |
| 2006/0048142 A1* | 3/2006 | Roese | H04L 63/20 717/176 |
| 2006/0053216 A1 | 3/2006 | Deokar | |
| 2006/0059092 A1* | 3/2006 | Burshan | H04L 67/18 705/51 |
| 2006/0143179 A1* | 6/2006 | Draluk | H04L 63/20 |
| 2006/0161641 A1* | 7/2006 | Sekiguchi | H04L 67/1029 709/219 |
| 2006/0190985 A1* | 8/2006 | Vasishth | G06F 21/604 726/1 |
| 2006/0242169 A1* | 10/2006 | Tunning | G06F 16/10 |
| 2006/0248337 A1* | 11/2006 | Koodli | H04W 12/06 713/171 |
| 2006/0253314 A1* | 11/2006 | Reznichenko | G06Q 10/06 705/7.27 |
| 2006/0259977 A1* | 11/2006 | Patrick | G06F 21/6245 726/26 |
| 2007/0005766 A1* | 1/2007 | Singhal | H04L 67/20 709/225 |
| 2007/0100701 A1* | 5/2007 | Boccon-Gibod | H04L 63/0492 705/21 |
| 2007/0124434 A1* | 5/2007 | Smith | G06F 9/45558 709/220 |
| 2007/0124797 A1 | 5/2007 | Gupta | |
| 2007/0156659 A1 | 7/2007 | Lim | |
| 2007/0234402 A1* | 10/2007 | Khosravi | H04L 63/0227 726/2 |
| 2007/0234408 A1 | 10/2007 | Burch | |
| 2007/0240231 A1* | 10/2007 | Haswarey | G06F 21/6218 726/28 |
| 2008/0005798 A1* | 1/2008 | Ross | G06F 21/33 726/26 |
| 2008/0065746 A1* | 3/2008 | Moghaddam | G06F 17/30899 709/220 |
| 2008/0083013 A1* | 4/2008 | Soliman | H04L 41/0893 726/1 |
| 2008/0109554 A1* | 5/2008 | Jing | H04L 12/14 709/230 |
| 2008/0120264 A1* | 5/2008 | Lee | H04L 41/0893 706/47 |
| 2008/0141339 A1* | 6/2008 | Gomez | H04L 63/08 726/1 |
| 2008/0184335 A1* | 7/2008 | Zhang | G06F 21/57 726/1 |
| 2008/0242422 A1* | 10/2008 | Kropivny | A63F 13/12 463/42 |
| 2008/0301437 A1 | 12/2008 | Chevalier | |
| 2009/0049512 A1 | 2/2009 | Manickam et al. | |
| 2009/0119770 A1* | 5/2009 | Soliman | H04L 63/20 726/14 |

(56) References Cited

U.S. PATENT DOCUMENTS

| | | | |
|---|---|---|---|
| 2009/0193493 A1* | 7/2009 | Becker | G06F 21/552 726/1 |
| 2009/0276204 A1* | 11/2009 | Kumar | H04L 63/0227 703/21 |
| 2010/0005511 A1* | 1/2010 | Maes | G06F 21/335 726/4 |
| 2010/0008299 A1* | 1/2010 | Shin | H04W 88/16 370/328 |
| 2010/0024019 A1 | 1/2010 | Backlund | |
| 2010/0064341 A1 | 3/2010 | Aldera | |
| 2010/0281524 A1 | 11/2010 | Ghittino | |
| 2010/0313239 A1* | 12/2010 | Chakra | G06F 21/6218 726/2 |
| 2010/0332504 A1* | 12/2010 | Brucker | G06F 21/6218 707/759 |
| 2011/0088084 A1* | 4/2011 | Yasaki | G06F 21/6218 726/5 |
| 2011/0093913 A1* | 4/2011 | Wohlert | H04L 63/0861 726/1 |
| 2011/0107358 A1* | 5/2011 | Shyam | G06F 9/5027 719/330 |
| 2011/0119481 A1* | 5/2011 | Auradkar | G06F 21/602 713/150 |
| 2011/0125894 A1* | 5/2011 | Anderson | H04L 9/3213 709/224 |
| 2011/0145425 A1* | 6/2011 | Xiao | H04L 41/28 709/229 |
| 2011/0145593 A1* | 6/2011 | Auradkar | H04L 9/006 713/189 |
| 2011/0209194 A1 | 8/2011 | Kennedy | |
| 2011/0211465 A1* | 9/2011 | Farrugia | H04L 12/14 370/252 |
| 2011/0219425 A1* | 9/2011 | Xiong | G06F 21/00 726/1 |
| 2012/0042395 A1* | 2/2012 | Jain | G06F 21/6218 726/30 |
| 2012/0072605 A1* | 3/2012 | Xu | H04L 63/0281 709/229 |
| 2012/0110632 A1* | 5/2012 | Burghart | G06F 21/604 726/1 |
| 2012/0131164 A1 | 5/2012 | Bryan | |
| 2012/0143817 A1* | 6/2012 | Prabaker | G06F 21/6218 707/608 |
| 2012/0159099 A1* | 6/2012 | Lindamood | H04L 67/1097 711/162 |
| 2012/0198467 A1 | 8/2012 | Jackson | |
| 2012/0240184 A1* | 9/2012 | Thirasuttakorn | H04L 63/10 726/1 |
| 2012/0246325 A1* | 9/2012 | Pancorbo Marcos | H04L 63/102 709/227 |
| 2013/0034019 A1* | 2/2013 | Mustajarvi | H04W 48/16 370/254 |
| 2013/0036447 A1* | 2/2013 | Lassesen | H04L 63/20 726/1 |
| 2013/0042298 A1* | 2/2013 | Plaza Fonseca | G06F 21/335 726/1 |
| 2013/0117313 A1 | 5/2013 | Miao | |
| 2013/0125210 A1* | 5/2013 | Felt | G06F 21/6218 726/4 |
| 2013/0250849 A1* | 9/2013 | Li | H04W 4/18 370/328 |
| 2013/0263210 A1* | 10/2013 | Lim | G06F 21/51 726/1 |
| 2013/0291054 A1* | 10/2013 | Arora | H04N 21/4334 726/1 |
| 2013/0298186 A1* | 11/2013 | Radkowski | G06F 17/00 726/1 |
| 2013/0318339 A1* | 11/2013 | Tola | H04L 63/0478 713/150 |
| 2013/0325915 A1* | 12/2013 | Ukai | G06F 16/182 707/827 |
| 2013/0326041 A1* | 12/2013 | Bellet | G06F 17/30174 709/223 |
| 2013/0332982 A1 | 12/2013 | Rao et al. | |
| 2014/0012833 A1 | 1/2014 | Humprecht et al. | |
| 2014/0059310 A1* | 2/2014 | Du | G06F 11/2094 711/162 |
| 2014/0068699 A1 | 3/2014 | Balacheff | |
| 2014/0090085 A1* | 3/2014 | Mattsson | G06F 21/6227 726/28 |
| 2014/0108648 A1* | 4/2014 | Nelke | H04L 41/5054 709/224 |
| 2014/0122429 A1* | 5/2014 | Chen | G06F 16/182 707/623 |
| 2014/0123207 A1* | 5/2014 | Agarwal | G06F 21/6218 726/1 |
| 2014/0128053 A1 | 5/2014 | Merchant | |
| 2014/0136779 A1* | 5/2014 | Guha | H04L 67/10 711/114 |
| 2014/0156848 A1* | 6/2014 | Uttaro | H04L 45/38 709/226 |
| 2014/0157370 A1* | 6/2014 | Plattner | G06F 21/6245 726/4 |
| 2014/0165134 A1 | 6/2014 | Goldschlag | |
| 2014/0181013 A1* | 6/2014 | Micucci | G06F 16/90 707/610 |
| 2014/0208304 A1* | 7/2014 | Subramanya | G06F 8/65 717/170 |
| 2014/0229596 A1 | 8/2014 | Burke | |
| 2014/0250504 A1* | 9/2014 | Hung | G06F 21/335 726/5 |
| 2014/0310771 A1* | 10/2014 | Marshall | G06F 21/6218 726/2 |
| 2014/0337914 A1* | 11/2014 | Canning | H04L 63/10 726/1 |
| 2014/0351573 A1 | 11/2014 | Martini | |
| 2015/0019480 A1* | 1/2015 | Maquaire | G06F 16/252 707/609 |
| 2015/0046394 A1* | 2/2015 | Onda | G06F 16/183 707/623 |
| 2015/0067881 A1* | 3/2015 | Badstieber | G06F 21/6254 726/26 |
| 2015/0095968 A1* | 4/2015 | Steiner | G06F 21/62 726/1 |
| 2015/0113010 A1* | 4/2015 | Muthyala | G06F 16/182 707/756 |
| 2015/0128205 A1 | 5/2015 | Mahaffey | |
| 2015/0135258 A1* | 5/2015 | Smith | G06F 21/45 726/1 |
| 2015/0150073 A1* | 5/2015 | Bhalerao | H04L 63/105 726/1 |
| 2015/0172320 A1* | 6/2015 | Colombo | H04L 63/105 726/1 |
| 2015/0195086 A1* | 7/2015 | Davison | G06F 21/602 713/168 |
| 2015/0201036 A1* | 7/2015 | Nishiki | H04L 67/1095 709/224 |
| 2015/0215405 A1* | 7/2015 | Baek | H04L 67/1097 709/219 |
| 2015/0222695 A1* | 8/2015 | Lee | H04L 41/12 709/201 |
| 2015/0234845 A1* | 8/2015 | Moore | G06F 16/137 707/747 |
| 2015/0236862 A1* | 8/2015 | Castro Castro | H04L 47/20 370/259 |
| 2015/0242502 A1* | 8/2015 | Chadha | G06F 17/30115 707/827 |
| 2015/0269383 A1* | 9/2015 | Lang | H04L 63/20 726/1 |
| 2015/0347451 A1* | 12/2015 | Lee | G06F 16/1844 707/610 |
| 2015/0356158 A1* | 12/2015 | Potapov | G06F 16/258 707/718 |
| 2015/0370615 A1* | 12/2015 | Pi-Sunyer | G05D 23/1917 700/276 |
| 2015/0381660 A1 | 12/2015 | Hsiung | |

(56) References Cited

U.S. PATENT DOCUMENTS

| | | | |
|---|---|---|---|
| 2016/0006753 A1* | 1/2016 | McDaid | H04W 12/12 |
| | | | 726/23 |
| 2016/0014157 A1* | 1/2016 | Gomez | H04L 63/10 |
| | | | 726/1 |
| 2016/0026590 A1* | 1/2016 | Park | G06F 13/4022 |
| | | | 710/316 |
| 2016/0094541 A1* | 3/2016 | Tan | H04L 63/0846 |
| | | | 713/156 |
| 2016/0105343 A1* | 4/2016 | Janarthanan | H04L 43/50 |
| | | | 370/252 |
| 2016/0149859 A1 | 5/2016 | Curtis | |
| 2016/0205101 A1 | 7/2016 | Verma et al. | |
| 2016/0277373 A1* | 9/2016 | Murray | H04L 9/0891 |
| 2016/0321310 A1* | 11/2016 | Alshammari | G06F 16/245 |
| 2016/0342534 A1* | 11/2016 | Krause | G06F 12/1458 |
| 2016/0342803 A1 | 11/2016 | Goodridge | |
| 2016/0352731 A1* | 12/2016 | Mentze | H04L 63/0876 |
| 2017/0012778 A1* | 1/2017 | Choyi | H04L 63/0884 |
| 2017/0012962 A1 | 1/2017 | Lissack | |
| 2017/0061148 A1* | 3/2017 | Buckley | G06F 21/6218 |
| 2017/0093916 A1* | 3/2017 | Arumugam | G06F 21/602 |
| 2017/0093925 A1 | 3/2017 | Sheretov | |
| 2017/0149786 A1* | 5/2017 | Alon | H04L 63/104 |
| 2017/0169088 A1* | 6/2017 | Hong | G06F 9/5005 |
| 2017/0195457 A1* | 7/2017 | Smith, II | H04L 63/102 |
| 2017/0208033 A1 | 7/2017 | Roskind | |
| 2017/0223024 A1* | 8/2017 | Desai | H04L 63/0272 |
| 2017/0257379 A1* | 9/2017 | Weintraub | H04L 63/107 |
| 2018/0007099 A1* | 1/2018 | Ein-Gil | H04L 67/14 |
| 2018/0131726 A1 | 5/2018 | Arumugam et al. | |
| 2018/0131727 A1 | 5/2018 | Arumugam et al. | |
| 2019/0260641 A1* | 8/2019 | Giust | H04L 67/141 |

FOREIGN PATENT DOCUMENTS

| | | | | |
|---|---|---|---|---|
| WO | WO-2015153924 A1 | * | 10/2015 | ............ H04W 12/08 |
| WO | WO-2018005874 A1 | * | 1/2018 | ......... G06F 21/6218 |

OTHER PUBLICATIONS

Joshi, Pallavi, Haryadi S. Gunawi, and Koushik Sen. "PREFAIL: A programmable tool for multiple-failure injection." In ACM SIGPLAN Notices, vol. 46, No. 10, pp. 171-188. ACM, 2011. (Year: 2011).*

Shvachko, Konstantin V. "HDFS Scalability: The limits to growth."; login:: the magazine of USENIX & SAGE 35, No. 2 (2010): 6-16. (Year: 2010).*

Khan, Mohammad Asif, Zulfiqar A. Memon, and Sajid Khan. "Highly available Hadoop namenode architecture." In 2012 International Conference on Advanced Computer Science Applications and Technologies (ACSAT), pp. 167-172. IEEE, 2012. (Year: 2012).*

Quillinan, T. B., & Foley, S. N. (Oct. 2004). Security in WebCom: Addressing naming issues for a web services architecture. In Proceedings of the 2004 workshop on Secure web service (pp. 97-105). (Year: 2004).*

Threat Modeling a Mobile Application, InfoSec Musings, security musings blogspot, Jun. 25, 2016, 12 pages. (Year: 2016).*

International Search Report for PCT/US2017/040118, dated Oct. 30, 2017.

International Application No. PCT/US2016/065853, Notification of Transmittal of the International Search Report and the Written Opinion of the International Searching Authority, dated Mar. 24, 2017, 14 pages.

International Application No. PCT/US2016/054107, Notification of Transmittal of the International Search Report and the Written Opinion of the International Searching Authority, dated Jan. 9, 2017, 13 pages.

Extended European Search Report in European Application No. 16852450.2, dated Jul. 3, 2018, 8 pages.

* cited by examiner

SHORT-CIRCUIT DATA ACCESS

BACKGROUND

In a distributed data storage system, data can be stored on multiple file systems. Various applications from business users, data scientists, analysts or developers can access the data. Each application can correspond to a specific user or a specific group of users. Each user or group of users can have particular access privileges to certain portions of the data. Various data security policies can specify which user can access which portions of data. A client device can submit a request to access data stored in the distributed data storage system. The request can include user credentials. A security system can determine whether to grant the request to access data based on the user credentials.

SUMMARY

In general, this specification describes a policy system for enforcing one or more data access policies.

A policy system performs a method that includes receiving, from a client device, a request to access data from a distributed database system. The distributed database system includes a name node and one or more data nodes. The request includes user credentials. The method includes determining, according to one or more data access policies and the user credentials, whether the request is to be denied, to be allowed with obligations, or to be allowed without obligations. The method includes, in response to different results of the determining, performing different actions. The actions include, upon determining that the request is to be denied, notifying the client device of request denial; upon determining that the request is to be allowed with obligations, forwarding the request to the name node; upon determining that the request is to be allowed without obligations, instructing the client device to submit the request directly to a short-circuit handler executing on the name node of the distributed database system that stores the data. The short-circuit handler is programmed to process the request and to handle cases where no data redaction is required.

Particular embodiments of the subject matter described in this specification can be implemented to realize one or more advantages. For example, compared to conventional technology where a policy system retrieves and process data from a data storage system and then forward the retrieved data to a client device, the techniques described in this specification can bypass certain stages of communication between a policy system and a data storage system upon determining that certain conditions are satisfied. Bypassing the communication can avoid unnecessary network bandwidth consumption, increase throughput rate, increase reliability, and accordingly, enhance performance of the distributed data storage system.

The details of one or more embodiments of the subject matter of this specification are set forth in the accompanying drawings and the description below. Other aspects, features, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Generally, a policy system can act like a proxy between the client device and the distributed data storage system. In response to the request for accessing data from a client device, the policy system enforces the data security policies. In enforcing the data security policies, the policy system can request data from the distributed data storage system on behalf of the client device, receive the data in response, and perform security actions on the retrieved the data according to the user credentials and the policies. The policy system then provides the processed data to the client system. In this example scheme, data flows from the distributed data storage system to the policy system, and then from the policy system to the client device.

A policy system as described in this specification enforces data security policies for requests to access data stored on a distributed data storage system received from a client device. The policy enforcement system can determine user credentials associated with the requests. The policy system then determines whether the user credentials allow the request to access the data and if yes, whether the user credentials allow the request to access the data without obligations. Upon determining that user credentials allow the request to retrieve the data without obligations, the policy enforcement system directs the client device to communicate directly with a name node, short-circuiting additional data retrieval and filtering by the policy system.

Figure 1A:
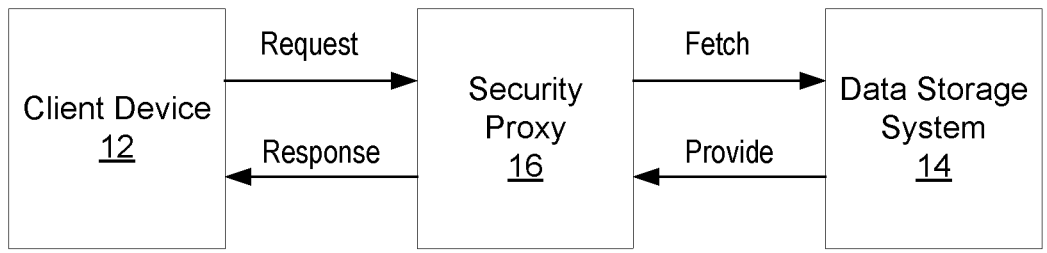
FIG. 1A is a block diagram illustrating conventional techniques of proxy-managed data access.

FIG. 1A is a block diagram illustrating conventional techniques of proxy-managed data access. A user of a client device 12 executes an application program that requests to access data stored on a data storage system 14. Access to data storage system 14 is shared by multiple users and multiple client devices. A security proxy 16 manages access privileges of the users on the data stored on the data storage system 14.

The security proxy 16 receives a request from the client device 12. The request includes user credentials. The security proxy 16 determines if the user represented by the user credentials has privileges to access some or all of the requested data. If yes, the security proxy 16 fetches the requested data from the data storage system 14. The data storage system 14 provides the requested data to the security proxy 16.

If the security proxy 16 determines that the user has access to only a portion of the requested data, the security proxy 16 can process the retrieved data such that only that portion of the data is visible to the user. The security proxy 16 then sends the processed data to the client device 12 as a response to the request. In this scheme, data flows from the data storage system 14 to the security proxy 16, and then from the security proxy 16 to the client device 12. In this scheme, the security proxy 16 can be a bottleneck in flow of data. Having all the requests flowing through the security proxy 16 may unnecessarily consume bandwidth.

Figure 1B:
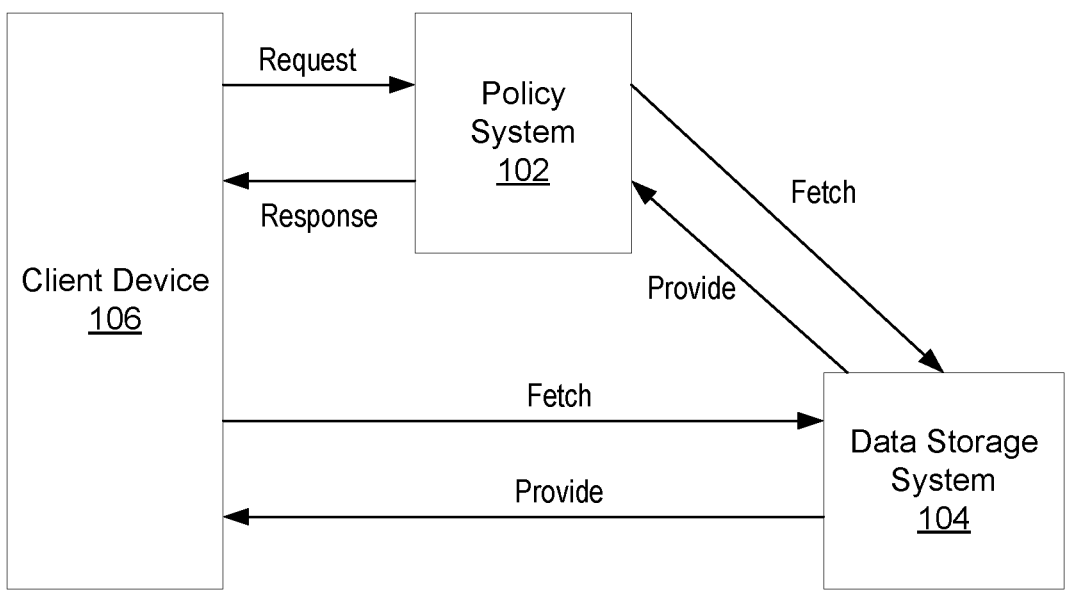
FIG. 1B is a block diagram illustrating a system implementing short-circuit data access techniques.

FIG. 1B is a block diagram illustrating a system implementing short-circuit data access techniques. A policy system 102 acts as a security proxy between a data storage system 104 and one or more client device 106, and manages access privileges on data stored on the data storage system 14. A user of a client device 106 executes an application program that requests access to data stored on data storage system 104. Access to data storage system 104 is shared by multiple users and multiple client devices.

The policy system 102 receives a request from the client device 106. The request includes user credentials. The policy system 102 determines whether or not the user represented by the user credentials has privileges to access the data. In addition, assuming the user has privilege to access the data, the policy system 102 determines whether the privilege is with or without obligations, e.g., whether the user has privilege to access only a portion of the requested data or all of the requested data. In this specification, the term "obligation" generally refers to conditions or limitations on a privilege or on accessing a data item. For example, a user U can have privileges to access a database table T. An obligation can specify that under condition A, user U can only access data column X of database table T. The condition can be based on, for example, time, location, data type, or a calculated value.

Upon determining that the user does not have access privilege, the policy system 102 can notify the client device 106 that access has been denied. Upon determining that the user has access privilege with obligations, the policy system 102 fetches the data from the data storage system 104, processes the data as appropriate for any restrictions imposed by the obligations, and provides the processed data to the client device 106 as a response.

Upon determining that the user has access privilege without obligations, the policy system 102 directs the client device 106 to communicate with the data storage system 104 directly. The client device 106 then fetches the data from the data storage system 104. In this scenario, data flows from the data storage system 104 to the client device 106 directly, "short-circuiting" the policy system 102 once the policy system 102 made the determination. Details on short-circuit data access techniques are described below in reference to FIG. 2.

Figure 2:
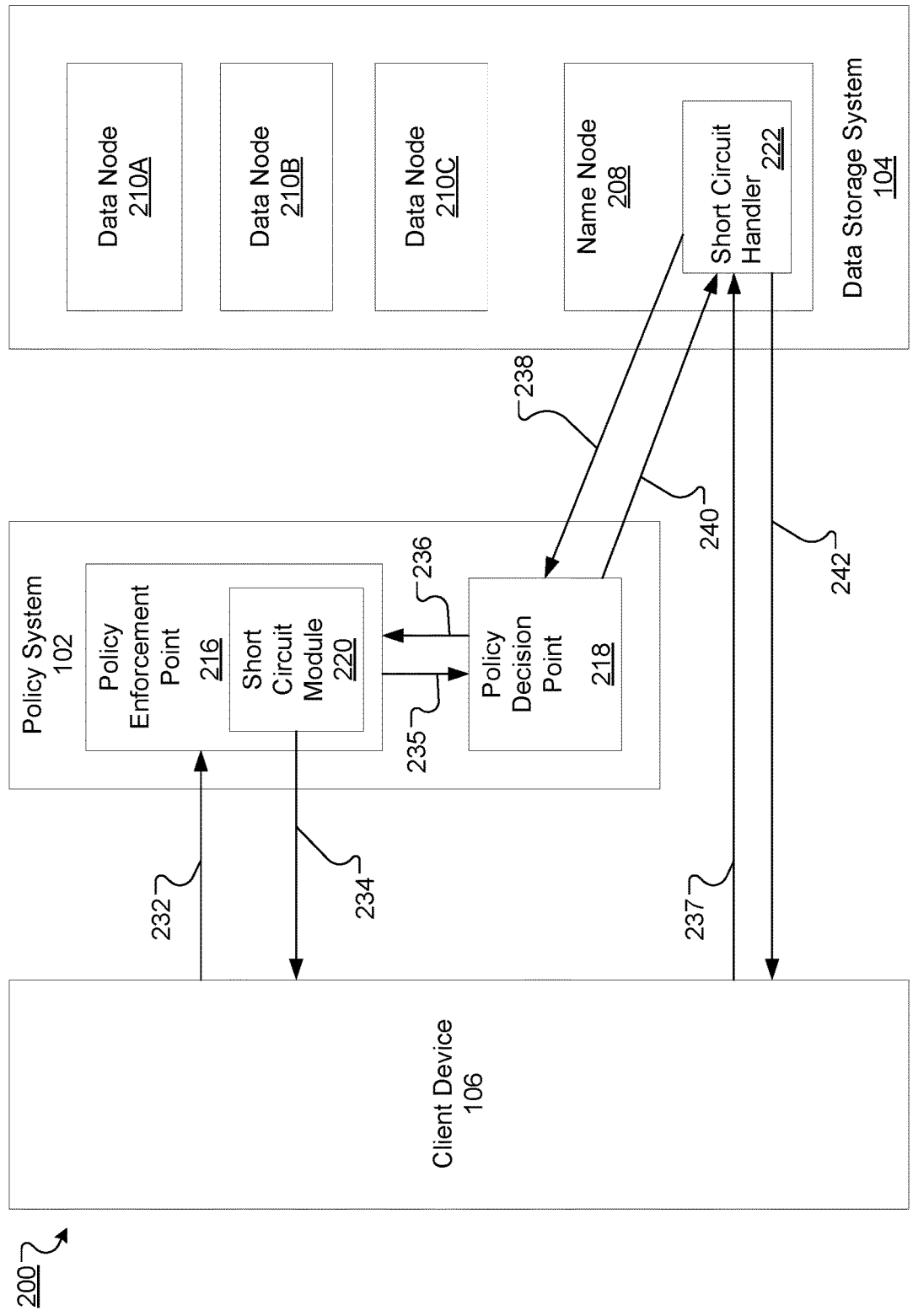
FIG. 2 is a block diagram illustrating an example proxy-managed data storage system implementing short-circuit data access techniques.

FIG. 2 is a block diagram illustrating an example proxy-managed data storage system 200 implementing short-circuit data access techniques. The proxy-managed data storage system 200 includes a policy system 102 and a data storage system 104. The policy system 102 serves as a security proxy, and acts like an intermediary between the data storage system 104 and one or more client devices 106. The policy system 102 provides access control to the data storage system 104 by implementing one or more data access policies, or simply referred to as policies. Each policy specifies whether a user of a client device 106 is allowed to access data stored in data storage system 104 and, if yes, whether the access shall be subject to obligations by the policy system 102. Data access is subject to obligations if, due to limited access privileges of the user, the data being accessed needs to be redacted (e.g., filtered or modified) before being returned to the user of a client device 106.

The data storage system 104 can be a distributed storage system having a master/slave architecture. For example, the data storage system 104 can be a Hadoop Distributed File System (HDFS). The data storage system 104 can include multiple nodes. Each node can include a processor associated with one or more storage devices. In various implementations, each node can correspond to a standalone computer, or to a virtual machine. In the example shown, the data storage system 104 includes a name node 208 and data nodes 210A, 210B and 210C. The name node 208 can be a master node and the data nodes 210A, 210B and 210C can be slave nodes.

The name node 208 stores metadata on mapping between data and data nodes 210A, 210B and 210C. Each of data node 210A, 210B and 210C can store a respective portion of the data. Therefore, when the name node 208 receives a request for a particular portion of data, the name node 208 can respond with a list of identifiers or addresses, e.g., Internet Protocol (IP) addresses, of data nodes that store the particular portion of data based on the mapping.

In the example shown, a client device 106 executing an application that seeks to access data stored on the data storage system can communicate with the policy system 102. The client device 106 can include a memory, e.g., a random access memory (RAM), for storing instructions and data and a processor for executing stored instructions. The memory can include both read only and writable memory. For example, the client device 106 can be a computer coupled to the policy system 102 through a data communication network, e.g., local area network (LAN) or wide area network (WAN), e.g., the Internet, or a combination of networks. Communication over the network can occur using TCP/IP protocols.

In the communication between the client device and the policy system 102, the client device 106 submits a request 232 for accessing data to the policy system 102. The request 232 includes user credentials and a data identifier. The user credentials (e.g., a user identifier and associated proof of identity) identify a user. The data identifier (e.g., a table name or a file name) identifies data for access. The request 232 also specifies an access type, e.g., whether the access is a read, write, or manage. Each user can correspond to one or more client devices 106. Each client device 106 can correspond to one or more users. For example, different users can log in on the same client device under different user accounts, and each user can log in on different client devices.

The policy system 102 can include one or more computers configured to implement policies for accessing data stored in the data storage system 104. In particular, the policy system 102 includes a policy enforcement point 216 and a policy decision point 218. The policy enforcement point 216 and policy decision point 218 are components of the policy system 102 that are configured to perform a security check on the request 232.

The policy enforcement point 216 receives the request 232, and determines from the request 232 the user credentials, identifier of the data requested, and access type. The policy enforcement point 216 submits a policy check request 235 to the policy decision point 218. The policy check request 235 includes the user credentials, the data identifier, and access type.

The policy decision point 218 of the policy system 102 determines whether the user identified in the user credentials has privileges to access identified data using the access type, based on one or more policies received from an administrator process. The policy decision point 218 is configured to determine whether the user has the privileges based on one or more policies. The policy decision point 218 can receive the policies from a policy administration point programed to receive the policies from an administrator process, or to generate the policies based on specifications of the policy system 102.

The policies restrict access based on a mapping between a user, particular data, and an access type. A policy can be a three-dimensional mapping between the user, the data, and the access type, specifying whether a user U has rights to access a database table T (or a file F) using access type A. In addition, the policy can specify whether the privileges to access certain data is with obligations or without obligations. If a policy specifies that the user U has privilege to access certain data without obligations, the policy system 102 can grant the user U access to the requested data in the entirety. If a policy specifies that the user U has privilege to access the requested data with obligations, the policy system 102 can grant the user U access to a portion of the requested data by redacting other portions of the requested data.

The example below illustrates the relationship between user, data, and access type as specified in a policy. Data stored in the data storage system 104 includes a table T of rows and columns, and a file F. Table T is a data table in a relational database. File F is an unstructured file. Some columns in the table T may include data about people, e.g., names, dates of birth, phone numbers, credit card information, social security numbers, or other personal information. The rows can include data about the individuals, e.g. sorted by unique identifier. A policy P1 specifies that a user U1 has no privilege to access the table T, but read only privilege on file F without obligations. A policy P2 specifies that a user U2 has privileges to access table T with obligations, e.g., user U2 has privileges to read data of some, but not all, columns of the table T, and has no privileges to write to table T. Policy P2 can specify that user U2 has read only privileges on file F. A policy P3 specifies that a user U3 has privileges to access table T without obligations, e.g., user U3 can access all data in table T without restriction and without redaction, and has privileges to access file F.

Upon receiving the policy check request 235 including user credentials, identifiers of data, and access type from the policy enforcement point 216, the policy decision point 218 makes a decision 236 on the privilege request of the policy enforcement point. The decision 236 can include denying access, allowing access with obligations, and allowing access without obligations. For example, the policy decision point 218 can determine that the user identified in the credentials is user U3, that the requested data is table T and file F, and that the requested access type is read only. According to the policy P3, the policy decision point 218 can make a decision 236 that the user has privilege without obligation to access the requested data. The policy decision point 218 can provide the decision 236 to the policy enforcement point 216 as a response to the policy check request 235.

Upon receiving the decision 236 from the policy decision point 218, the policy enforcement point 216 can perform one of three actions. In a first scenario, the decision 236 indicates that data access shall be denied. This would occur if the policies indicate that the user does not have access privilege to the data. In response, the policy enforcement point 216 can notify the client device 106 that a user's request to access certain data (e.g., table T or file F) is denied.

In a second scenario, the decision 236 indicates that data access is allowed with obligations. In response, the decision can include user and data specific obligations. The obligations can specify a portion of the data that needs to be redacted before being presented to the user. In this case, the policy enforcement point 216 can enforce the decision. Enforcing the decision can include modifying a data query in the data request. Modifying the data query can include redacting or removing a column name in the query. For example, enforcing the decision can include changing a column name in a SQL query to blank or to a constant string. Enforcing the decision can include filtering data fetched from the data storage system 104, e.g., by deleting a file or by passing only a portion of the content of the file. Enforcing the decision can include masking data fetched from the data storage system 104, e.g., by replacing certain fetched data with string masks. For example, enforcing the decision can include masking at least a portion of a social security number with a string such that a masked social security number reads "XXX-XX-6789" rather than "123-45-6789." Enforcing the decision can include encrypting data fetched from the data storage system 104. Enforcing the decision can include performing various combinations of all of the above according to the decision. The policy enforcement point 216 interacts with the name node 208 to obtain metadata, e.g., locations of the data to be retrieved. The policy enforcement point 216 then retrieves data from one or more of data nodes 210A, 210B and 210C. The policy enforcement point 216 passes redacted data to the client device 106. The client device 106 need not interact with the data storage system 104 directly.

In the third scenario, the decision 236 from the policy decision point 218 can indicate that the user is allowed to access the request data without obligations. Upon receiving this decision 236, a short-circuit module 220 of the policy enforcement point determines that redaction of the data is unnecessary for the request 232 from the client device 106. The short-circuit module 220 then bypasses the data processing actions of the policy enforcement point 216. The short-circuit module 220 sends a response 234 to the client device 106. In the response 234, the short-circuit module 220 directs the client device 106 to communicate with the data storage system 104 directly. The response 234 can include an identifier or address of the name node 208 of the data storage system 104. The client device 106 then communicates with the name node 208 of the data storage system 104 directly, by sending a request 237 to the name node 208 of the data storage system 104. In some implementations, the request 237 can be the same as the request 232 previously sent to the policy system 102.

The name node 208 can include a short-circuit handler 222. The short-circuit handler 222 is a component of the name node 208 configured to determine, based on a sender of the request 237, whether to perform a security check on the request. In some implementations, the short-circuit handler 222 is a plugin component of the name node 208. The short-circuit handler 222 first determines whether the request 237 is from a policy system 102 or from a client device 106. If the short-circuit handler 222 determines a request is from the policy system 102, the short-circuit handler 222 need not perform addition actions. The short-circuit handler 222 simply passes the request to other components of the name node 208 for processing.

If the short-circuit handler 222 determines that a request is from a client device 106, to ensure that the name node 208 prevents unauthorized users from accessing specific data, the short-circuit handler 222 performs a security check on the request. In this example, the short-circuit handler 222 of name node 208 determines that the request 237 is from the client device 106. In response, the short-circuit handler 222 performs a security check on the request 237. The short-circuit handler 222 can to initiate communication with the policy system 102 from within the data storage system 104 to perform the security check.

The short-circuit handler 222 submits a security check request 238 to the policy decision point 218 to verify that the user having the credentials in the request 237 indeed has privilege to access the requested data without obligations. The policy decision point 218 can make a decision 240 on what access privilege the user has on the requested data, and provide the decision 240 to the short-circuit handler 222 responsive to the security check request 238. In this example, the policy decision point 218 confirms that user U3 has privileges to access the requested table T and file F without obligation.

Upon receiving the decision 240 from the policy decision point 218, the short-circuit handler 222 can determine an action based on the decision. Upon determining that the decision 240 indicates that the user has no access privilege on the requested data, or upon determining that the decision indicates that the user has access privilege with obligations, the short-circuit handler 222 can deny the request 237, and inform the client device 106 of the decision.

Upon determining that the decision 240 from the policy decision point 218 indicates that the user has access privilege on the requested data without obligations, the short-circuit handler 222 passes the request 237 from the client device 106 to other components of the name node 208, as if the request 237 is from the policy system 102. The data storage system 104 then provides the requested data in a response 242 to the client device 106 directly, bypassing the policy system 102.

In various implementations, the data storage system 104 can provide the data in various ways. For example, in some other implementations, the short-circuit handler 222 can retrieve the requested data from a data node, and return the retrieved data to the client device 106. In some implementations, the short-circuit handler 222 can receive information on the data, including, for example, an identifier or address of a data node 210A storing the data, and provide the identifier or address to the client device 106 in the response 242. The client device 106 can then retrieve the data from the data node 210A directly. Data node 210A can implement various may implement another short-circuit handler that ensures a policy allows the client device 106 to directly access the data.

The example described above can have variations. For example, in some implementations, the short-circuit module 220 of the policy enforcement point 216 need not send a response 234 to the client device 106 to notify the client device 106 to resubmit a request to the data storage system 104. Instead, the short-circuit module 220 can redirect the original request 232 to the name node 208, along with a flag indicating that a security check has already been performed and along with an identifier or address of the client device 106. The short-circuit handler 222 can receive this request and associated flag and identifier. Upon determining that the request is associated with the flag, the short-circuit hander 222 can cause the name node 208 to retrieve data, and send the retrieved data directly to the client device 106 according the identifier or address.

In various implementations, the technology can be implemented on various proxy-protected resources that are different from data storage system 104. A proxy can short-circuit itself upon determining a request from a requesting client for data does not require the proxy to perform redactions or other processing of the data. The proxy can instruct the client to access the resources directly. The resources can confirm that the request is legitimate by inquiring the proxy, and then, upon confirmation, providing the data to the client directly.

Figure 3:
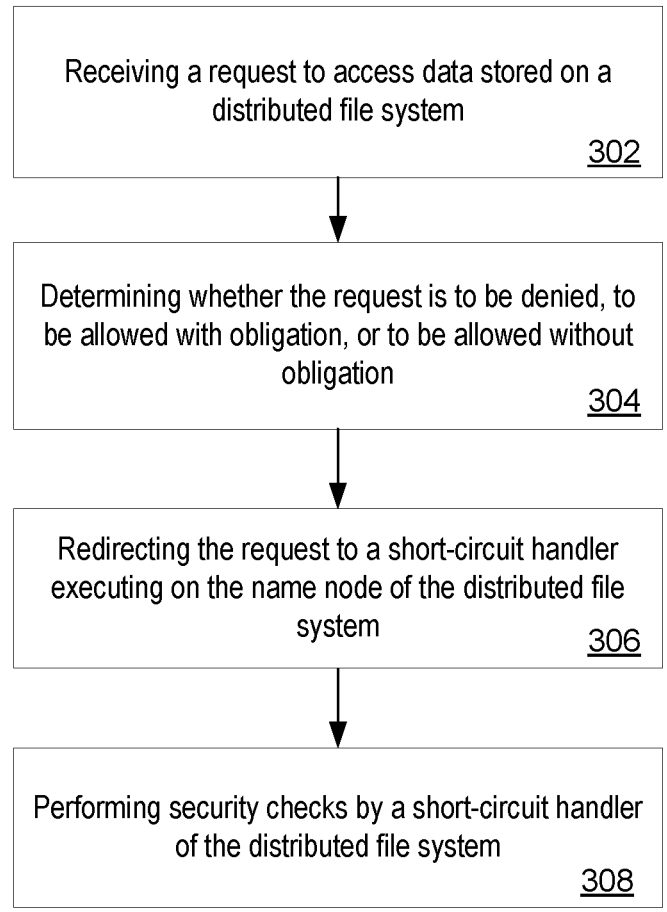
FIG. 3 is a flowchart illustrating an example method of short-circuit data access.

FIG. 3 is a flowchart illustrating an example method 300 of short-circuit data access. For convenience, the method 300 will be described with respect to a policy system, e.g., the policy system 102 of FIG. 1. The policy system includes one or more computing devices that execute software to implement the method 300.

The policy system receives (302), from a client device, a request to access data stored one a distributed file system. The request includes user credentials and information identifying the data to be accessed. The distributed file system includes a name node and one or more data nodes. In various implementations, the distributed file system can be a distributed relational database system, a distributed file system for storing unstructured files, or a combination of the above. The distributed file system can be an RDFS.

A policy decision point of the policy system determines (304) whether the request is to be denied, to be allowed with obligations, or to be allowed without obligations. The policy decision point makes the determination according to one or more data access policies, the user credentials, data requested, and requested access type. The policy decision point can receive the one or more policies from an administrator process. The obligations can be defined by a setting in the one or more data access policies. The setting can specify whether at least a portion of the data that the client requests to access shall be redacted.

The policy system perform various actions in response to results of the determination. Upon determining that the request is to be denied, the policy system notifies the client device of request denial. Upon determining that the request is to be allowed with obligations, the policy system requests data from the distributed file system. The policy system can retrieve the data and redact the retrieved data according to the obligations. For example, the policy system can filter, mask, or encrypt at least a portion of the retrieved data according to the setting. Filtering the data can include modifying a query to avoid retrieving certain portion of the data, preventing a portion of data retrieved from the distributed file system from being sent to the client device, or both. Masking the data can include replacing a portion of the data with certain masks, for example, replacing a number (e.g., a social security number) with a string (e.g., "XXX-XX-XXXX").

Upon determining that the request is to be allowed without obligations, the policy system performs short-circuiting actions, including redirecting (306) the request to a short-circuit handler executing on the name node of the distributed file system. In some implementations, redirecting the request can include providing an identifier or address of the name node to the client device, and instructing the client device to submit the request to the name node rather than to the policy system. In some implementations, redirecting the request can include forwarding the request, as well as identifier or address of the client device, to the name node. In some implementations, the policy system can limit the short-circuit actions to certain access types, e.g., read only.

The short-circuit handler can perform (308) security checks upon receiving the request from the client device 106. The short-circuit handler verifies with the policy decision point that the request from the client device is, indeed, to be allowed without obligations. Upon verification, the short-circuit handler allows the client device to access the requested data. Performing the verification under various circumstances can include determining whether one or more requests received by the short-circuit handler are received from the client device or from the policy system. In some implementations, the short-circuit handler communicates with the policy decision point for verification only upon determining that the one or more requests are from the client device.

Upon determining that the one or more requests are from the client device, the short-circuit handler can initiate the communication with the policy decision point, and submit at least a portion of the request (e.g., the user credentials, identifiers or addresses of the data to be accessed, and the type of access) to the policy decision point. The policy decision point can respond by sending a decision indicating whether the access is denied, allowed with obligations, or without obligations, according to the policies. Upon receiving a decision that the access is denied or allowed with obligations, the short-circuit handler can determine that the request is illegitimate, and deny the request. Upon receiving a decision that the access is allowed without obligations, the short-circuit handler can permit the name node to process the request and provide the requested data to the client device.

Figure 4:
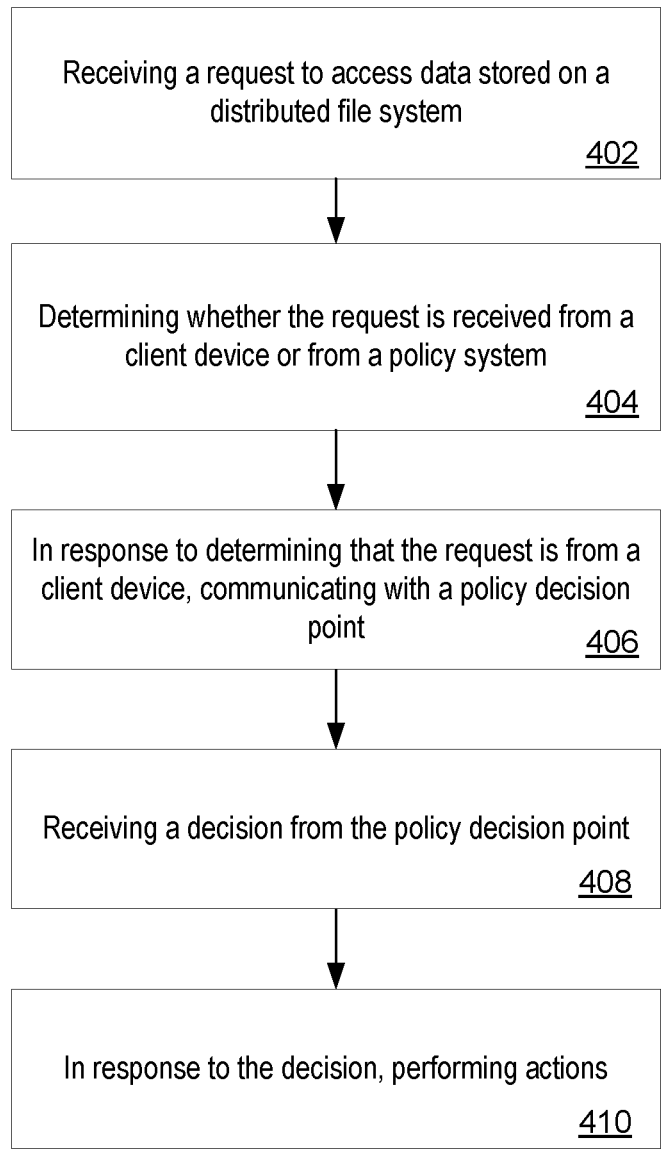
FIG. 4 is a flowchart illustrating an example method of short-circuit data access.

FIG. 4 is a flowchart illustrating an example method 400 of short-circuit data access. Method 400 can be performed by a processor implementing a short circuit handler, e.g., the short circuit handler 222 of FIG. 2.

The short circuit handler executes on a name node of a distributed file system. The short circuit handler receives (402) a request to access data stored on the distributed file system. The request is associated with user credentials. The short circuit handler determines (404) whether the request received by the short circuit handler is received from a client device or from a policy system. The distributed file system can be an RDFS.

In response to determining that the request is from a client device, the short circuit handler communicates (406) with a policy decision point of the policy system for verification of the user credentials. The short circuit handler receives (408) a decision from the policy decision point. The decision can indicate whether the request is to be denied, to be allowed with obligations, or to be allowed without obligations. The obligations can be defined by a setting in the one or more data access policies. The setting can specify that at least a portion of the data to be accessed is to be redacted.

In response to the decision, the short circuit hander performs (410) various actions. The actions can include, upon determining that the request is to be denied or to be allowed with obligations, notifying the client device of a request denial. The actions can include, upon determining that the request is to be allowed without obligations, allowing the client device to access the requested data.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user Us well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:

receiving, from a client device by a policy system, a request to access data stored on a distributed file system comprising a name node and one or more data nodes, the request comprising user credentials, the name node being separate from the policy system;

determining, by a policy decision point of the policy system and according to (i) one or more data access policies and (ii) the user credentials, whether the request is to be denied, to be allowed with obligations that define conditions for access to a limited portion of the data requested by the client device, or to be allowed without obligations; and in response to results of the determining, perform, by the policy system, actions including:

based at least on a determination that the request is to be denied, notifying the client device of request denial by the policy system;

based at least on a determination that the request is to be allowed with obligations, requesting data from the distributed file system by the policy system; and based at least on a determination that the request is to be allowed without obligations:

redirecting, by the policy system, the request to a short circuit handler executing on the name node of the distributed file system, the short circuit handler configured to determine whether to perform security check actions on the request based on a sender of the request, wherein redirecting the request comprises either (i) instructing the client device to re-submit the request to the short circuit handler executing on the name node rather than to the policy system or (ii) forwarding the request on behalf of the client device to the short circuit handler, and in response to receiving a verification request from the short circuit handler, providing, by the policy decision point, a verification to the short circuit handler, the verification verifying that the redirected request requires no obligations and authorizing the name node on the distribution file system to allow the client device to access requested data specified in the redirected request without obligation.

2. The method of claim 1, wherein the distributed file system is a Hadoop Distributed File System (HDFS).

3. The method of claim 1, wherein the obligations are defined by a setting in the one or more data access policies, the setting specifying that at least a portion of the data to be accessed is to be redacted.

4. The method of claim 3, comprising, based at least on a determination that the request is to be allowed with obligations, redacting data retrieved from the distributed file system, wherein the redacting comprises at least one of filtering, masking or encrypting at least a portion of the retrieved data according to the setting.

5. The method of claim 3, further comprising performing, by the short circuit handler the security check actions, the security check actions comprising:
   determining whether one or more requests received by the short circuit handler are received from the client device or from the policy system; and
   communicating with the policy decision point for verification only based at least on a determination that the one or more requests are from the client device and not from the policy decision point.

6. The method of claim 5, further comprising denying, by the short circuit handler, the one or more request upon verification from the policy decision point that the one or more requests are to be allowed with obligations.

7. The method of claim 1, wherein the verification request initiated by the short circuit handler is to inquire whether the request is to be denied, to be allowed with obligations, or to be allowed without obligations.

8. The method of claim 1, wherein redirecting comprises forwarding by the policy system to the short circuit handler, the request on behalf of the client device, and wherein the verification is provided, by the policy system, in form of a flag indicating that the request is allowed without obligation.

9. A system comprising:
   one or more processors; and
   a non-transitory computer-readable medium storing instructions that, upon execution by the one or more processors, cause the one or more processors to perform operations comprising:
   receiving, from a client device by a policy system, a request to access data stored on a distributed file system comprising a name node and one or more data nodes, the request comprising user credentials, the name node being separate from the policy system;
   determining, by a policy decision point of the policy system and according to (i) one or more data access policies and (ii) the user credentials, whether the request is to be denied, to be allowed with obligations that define conditions for access to a limited portion of the data requested by the client device, or to be allowed without obligations; and
   in response to results of the determining, perform, by the policy system, actions including:
   based at least on a determination that the request is to be denied, notifying the client device of request denial by the policy system;
   based at least on a determination that the request is to be allowed with obligations, requesting data from the distributed file system by the policy system; and
   based at least on a determination that the request is to be allowed without obligations:

redirecting, by the policy system, the request to a short circuit handler executing on the name node of the distributed file system, the short circuit handler configured to determine whether to perform security check actions on the request based on a sender of the request, wherein redirecting the request comprises (i) either instructing the client device to re-submit the request to the short circuit handler executing on the name node rather than to the policy system or (ii) forwarding the request on behalf of the client device to the short circuit handler, and
   in response to receiving a verification request from the short circuit handler, providing, by the policy decision point, a verification to the short-circuit handler, the verification verifying that the redirected request requires no obligations and authorizing the name node on the distribution file system to allow the client device to access requested data specified in the redirected request without obligation.

10. The system of claim 9, wherein the distributed file system is a Hadoop Distributed File System (HDFS).

11. The system of claim 9, wherein the obligations are defined by a setting in the one or more data access policies, the setting specifying that at least a portion of the data to be accessed is to be redacted.

12. The system of claim 11, the operations comprising, based at least on a determination that the request is to be allowed with obligations, redacting data retrieved from the distributed file system, wherein the redacting comprises at least one of filtering, masking or encrypting at least a portion of the retrieved data according to the setting.

13. The system of claim 11, wherein the short circuit handler is configured to perform the security check actions that comprise:
   determining whether one or more requests received by the short circuit handler are received from the client device or from the policy system; and
   communicating with the policy decision point for verification only based at least on a determination that the one or more requests are from the client device.

14. The system of claim 13, wherein the short circuit handler is configured to deny the one or more request upon verification from the policy decision point that the one or more requests are to be allowed with obligations.

15. The system of claim 9, wherein the short circuit handler is configured to initiate communication with policy system to inquire whether the request is to be denied, to be allowed with obligations, or to be allowed without obligations.

16. A non-transitory computer-readable medium storing instructions that, upon execution by one or more processors, cause the one or more processors to perform operations comprising:
   receiving a request to access data by a short circuit handler executing on a name node of a Hadoop Distributed File System (HDFS), the request being associated with user credentials;
   determining, by the short circuit handler, whether the request received by the short circuit handler is received from a client device or from a policy system;
   in response to determining that the request is from a client device, performing, by the short circuit handler, actions including:
   communicating with a policy decision point of the policy system for verification of the user credentials,
   receiving a decision from the policy decision point on whether the request is to be denied, to be allowed with obligations that define conditions for access to a limited portion of the data requested by the client device, or to be allowed without obligations, and in response to the decision, performing actions including:

based at least on a determination that the request is to be denied or to be allowed with obligations, notifying the client device of a request denial, and based at least on a determination that the request is to be allowed without obligations, allowing the client device to access the requested data;

in response to determining that the request is from a policy system, determining whether the request includes a flag indicating that the request is to be allowed without obligation; and in response to determining that the request includes the flag, allowing a client computing device to access the requested data, the client computing device being identified based on the user credentials associated with the request.

17. The non-transitory computer-readable medium of claim 16, wherein the obligations are defined by a setting in one or more data access policies, the setting specifying that at least a portion of the data to be accessed is to be redacted.

18. The non-transitory computer-readable medium of claim 16, wherein the policy system is configured to enforce one or more data access policies for accessing the data.

19. A non-transitory computer-readable medium storing instructions that, upon execution by one or more processors, cause the one or more processors to perform operations comprising:

receiving a request to access data by a short circuit handler executing on a name node of a distributed file system, the request being associated with user credentials;

determining, by the short circuit handler, whether the request received by the short circuit handler is received from a client device or from a policy system;

in response to determining that the request is from a client device, performing, by the short circuit handler, actions including:

communicating with a policy decision point of the policy system for verification of the user credentials, receiving a decision from the policy decision point on whether the request is to be denied, to be allowed with obligations that define conditions for access to a limited portion of the data requested by the client device, or to be allowed without obligations, the obligations being defined by a setting in one or more data access policies, the setting specifying that at least a portion of the data to be accessed is to be redacted, and in response to the decision, performing actions including:

based at least on a determination that the request is to be denied or to be allowed with obligations, notifying the client device of a request denial, and based at least on a determination that the request is to be allowed without obligations, allowing the client device to access the requested data;

in response to determining that the request is from a policy system, determining whether the request includes a flag indicating that the request is to be allowed without obligation; and in response to determining that the request includes the flag, allowing a client computing device to access the requested data, the client computing device being identified based on the user credentials associated with the request.

20. The non-transitory computer-readable medium of claim 19, wherein the distributed file system is a Hadoop Distributed File System (HDFS).

* * * * *